United States Patent [19]

Krumme

[11] Patent Number: 4,773,680
[45] Date of Patent: Sep. 27, 1988

[54] PIPE COUPLERS
[75] Inventor: John F. Krumme, Woodside, Calif.
[73] Assignee: Beta Phase, Inc., Menlo Park, Calif.
[21] Appl. No.: 646,744
[22] Filed: Sep. 4, 1984
[51] Int. Cl.[4] .............................................. F16L 25/00
[52] U.S. Cl. .................................... 285/381; 285/340; 285/906
[58] Field of Search ............... 285/381, 383, 340, 906, 285/187, 369, DIG. 3, 110; 403/273; 339/DIG. 1; 174/DIG. 8; 29/447; 148/402; 428/913; 277/26

[56] References Cited

U.S. PATENT DOCUMENTS

| | | | |
|---|---|---|---|
| 2,535,694 | 12/1950 | Payne | 285/383 X |
| 2,968,850 | 1/1961 | Tinnerman | 285/DIG. 3 |
| 2,995,388 | 8/1961 | Morello et al. | 285/340 |
| 3,632,141 | 1/1972 | Larsson | 285/333 X |
| 3,759,552 | 9/1973 | Levinsohn et al. | |
| 3,801,954 | 4/1974 | Dorrell | |
| 4,198,081 | 4/1980 | Harrison et al. | |
| 4,281,841 | 8/1981 | Kim et al. | |
| 4,296,955 | 10/1981 | Martin | 285/381 |
| 4,515,213 | 5/1985 | Rogen et al. | 277/26 X |
| 4,573,713 | 3/1986 | Kipp | 285/340 |

FOREIGN PATENT DOCUMENTS

| | | | |
|---|---|---|---|
| 1437902 | 3/1966 | France | 285/110 |
| 1902491 | 11/1970 | Fed. Rep. of Germany | 277/26 |
| 2641472 | 3/1978 | Fed. Rep. of Germany | 285/340 |
| 1086282 | 4/1984 | U.S.S.R. | |
| 1554432 | 10/1979 | United Kingdom | |
| 1580036 | 11/1980 | United Kingdom | |

Primary Examiner—Dave W. Arola
Attorney, Agent, or Firm—Burns, Doane, Swecker & Mathis

[57] ABSTRACT

Rings of shape memory metal are deformed to be insertable between coaxial and overlapping surfaces of a conduit and a coupler so that upon heating above their transition temperature, the rings attempt to return to their undeformed shape and seal the opening between the two surfaces; the sealing rings being concave-convex with the convex surface directed toward the adjacent end of the conduit whereby interval pressure in the conduit tends to further expand the metal and increase the seal. Retainer rings in the general form of the section of a conic may be employed to provide additional strength against separation.

28 Claims, 3 Drawing Sheets

PIPE COUPLERS

FIELD OF INVENTION

The present invention relates to coupling devices and more particularly to devices employing shape memory to rigidly couple and seal pipes and related fluid conduits and other tubular structures.

BRIEF DESCRIPTION OF THE PRIOR ART

It is known in the art to use shape memory metals as coupling mechanisms between tubular members. Examples of such devices are set forth in U.S. Pat. No. 3,801,954, wherein Nitinol (a Nickel-Titanium alloy) is employed as a heat activated locking member between the plug and receptacle of an electrical connector.

As indicated in said patent, Nitinol can be manufactured to an original shape deformed below its transition temperature while in its weak martensitic state and thereafter heated above its transition temperature to its relatively austenitic state wherein it also resumes its undeformed shape. If the material is again appropriately cooled below its transition temperature, the material loses its great strength and may be readily deformed.

Additional patents which may be of interest are U.S Pat. No. 4,198,081 wherein a shape memory sleeve is disposed about two conduits and then heat recovered to its original shape to clamp the pipes. To be effective, the coupling must deform the conduit which in many instances is unacceptable.

In U.S. Pat. No. 3,759,552, there is disclosed the use of a shape memory metal element to seal the connection between two pipes; the metal element being in the general shape of a "V". The element engages opposed surfaces of two connector elements (couplers) that are secured together. The V-shaped member has rounded edges in contact with the couplers so that galling does not occur.

The couplers disclosed in the aforesaid patents are acceptable for their intended purposes, but none of them provides a low cost, permanent junction that is easily installed and minimizes the use of materials so that the permanent junction is inexpensive relative to both materials and labor.

SUMMARY OF THE INVENTION

The present invention employs as a sealing element and as a holding element, one or more rings formed from a shape memory material having a martensitic state in which the material is relatively soft and springy, and an austenitic state in which the material is hard and rigid. Such materials may be nickel-titanium mixtures (Nitinol), nickel-iron-titanium mixtures, or copper based materials, all as well known in the art.

According to the invention wherein two conduits (pipes) are to be joined or an end cap fitted to a pipe, preferably substantially permanently, a coupler is employed having an annular region engaging the conduit to provide position stability between the pipe and coupler. The coupler has an annulus disposed about or spaced from the conduit to provide an annular space for receiving the sealing and retaining rings, if necessary. The rings in their martensitic state are convex-concave, similar in shape to a Belleville washer, and are initially positioned over the conduit, the coupler applied over the rings and the rings heated.

The rings have sharp edges if the material of the rings is harder than that of the conduit and the coupler or are covered by a material harder than such and having sharp edges. Upon heating of the rings above their transition tmeperature, they tend to straighten out and engage and dig into the adjacent annular surfaces sealing the regions on opposite sides thereof from one another.

If two conduits are to be joined, then the coupler has two annular regions disposed on opposite sides of the region that directly engages the conduits so that sealing rings may be applied on opposite sides of the abutting surfaces of the conduits. The convex surfaces of the rings are directed towards the abutted surfaces of the conduits so that if pressure is developed in the conduits such pressure further tends to straighten the rings and increase the sealing force.

The sealing rings do not develop a particularly strong force to resist separation of the conduit and coupler. According to the present invention, retaining rings usually of the same material as the sealing rings, are employed; such rings being straight but slanted in the annulus in a direction to resist separation of the pipes. These rings also dig into the circumferential surfaces defining the annular space and thus resist separation of the conduits and coupler.

DETAILED DESCRIPTION OF THE PREFERRED EMBODIMENTS

Figure 1:
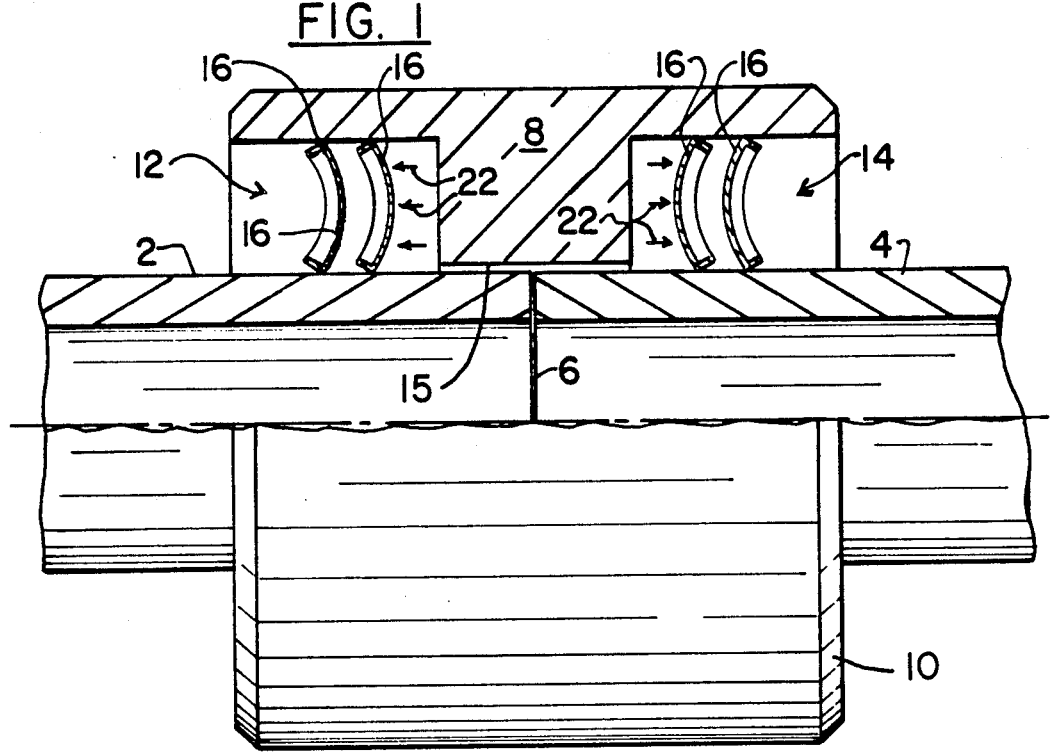
FIG. 1 is a longitudinally extending cross-sectional view of one half of a first embodiment of the invention applied to couple two conduits end to end.

Referring now specifically to FIG. 1 of the accompanying drawings, there is illustrated two conduits 2 and 4 which are to be joined, and if necessary, have their interiors sealed from ambient. The conduits 2 and 4 are usually butted as at 6 or at least inserted sufficiently to insure that the seal rings have a good seat on the conduits.

An annular coupler 8 having a T-shaped axial cross-section is located about the conduits 2 and 4 and preferably located symmetrically with respect to the butted ends of the conduits as designated by the reference numeral 6. A cross arm 10 of the member 8 provides hollow annuli 12 and 14 between the arm and conduits 2 and 4, respectively. The base 15 of the T-shaped member should fit relatively snugly about the conduits and have an axial length of one to one and one-half times the circumference of the conduits to insure good position stability between the elements.

Figure 2:
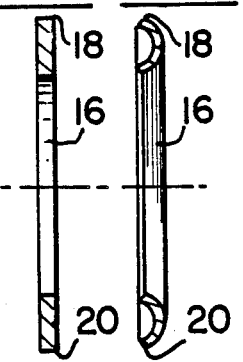
FIG. 2 is a cross-sectional view of the manufactured shape of the sealing rings of FIG. 1.
Figure 3:
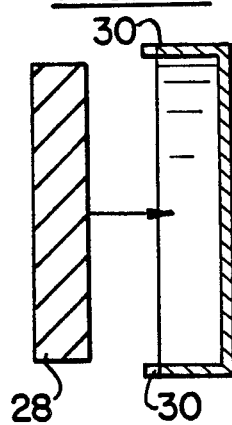
FIG. 3 is a cross-sectional view of the ring of FIG. 2 deformed for use in the assemblage of FIG. 1.

Rings 16 fabricated from heat recoverable shape memory metal, such as Nitinol or Beta Brass, or the like, are disposed in the hollow annuli 12 and 14. Reference is made initially to FIGS. 2 and 3 for illustrations of the rings 16 in various stages of development. The ring of FIG. 2 is the form as manufactured. It is in the shape of a flat washer, but with sharp edges particularly at locations 18 and 20. The ring is cooled below its transition temperature and deformed into the convex-concave shape of FIG. 3 so that the edges 18 and 20 constitute the outermost and innermost edges of the ring, respectively.

In use, one or a plurality of rings 16 may be inserted into the hollow annuli 12 and 14 with the convex surfaces directed toward the butted ends 6 of the conduits, all as illustrated in FIG. 1. The rings are initially of interior and exterior diameters greater than and less than, respectively, the diameters of the inner and outer surfaces defining the annuli 12 and 14. When the rings are heated above the appropriate transition temperature, they attempt to assume their flat shapes as illustrated in FIG. 2. In the process, the sharp edges 18 and 20 bite into the annular surfaces of the connector and the adjacent pipe and seal the enclosure. If the interior of pipes 2 and 4 are pressurized, the internal pressure is applied to the convex surfaces of the innermost rings, as illustrated by arrows 22, tending to straighten them out and thereby enhancing the gripping and sealing effect.

It should be noted that the transition temperature must be below the operating temperature of the system to an extent to insure that the temperature of the rings is at all times above the transition temperature.

Figure 4A:
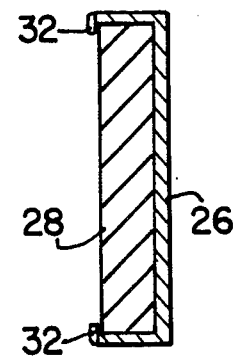
FIGS. 4A to 4C are cross-sectional views illustrating the assembly of an alternative embodiment of sealing rings which may be employed with the assemblage of FIG. 1.
Figures 4B, 4C:
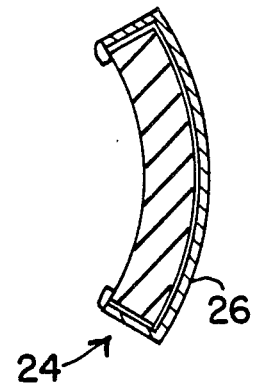

Referring now to FIGS. 4A-4C of the accompanying drawings, there is illustrated the assembly of a ring generally designated by reference numeral 24, FIG. 4C, having an outer shell over part of the shape memory metal. The outer shell is used in those instances when ring 16 is not hard enough to bite into the adjacent surfaces; the outer shell being of material that is hard enough to so do. Specifically, the conduit and/or sleeve may be of materials considerably harder than the shape memory metal, and thus an outer hard covering may be required. Conversely, the conduits may be considerably softer than the shape memory and may be badly damaged by the rings. Also, it may be that contact between the ring and the conduit should, in other instances, be between members of the same metal.

In the above instances, the shape memory metal is to be clad with an outer sleeve as indicated by the reference numeral 26. A shape memory annular ring 28, rectangular in cross-section, is sealed in the member 26 (see FIG. 4A) which is annular and U-shaped in cross-section. Legs 30 of the member 26 are axially larger than the member 28 is thick, so that the ends of the legs may be turned over as at 32 in FIG. 4B to retain the member 28 within the sleeve 26. Thereafter, the assembly is deformed, see FIG. 4C, and may be employed as illustrated in FIG. 1 of the accompanying drawings. Rather than turning over the edges as at 32, the members may be welded.

Figure 5:
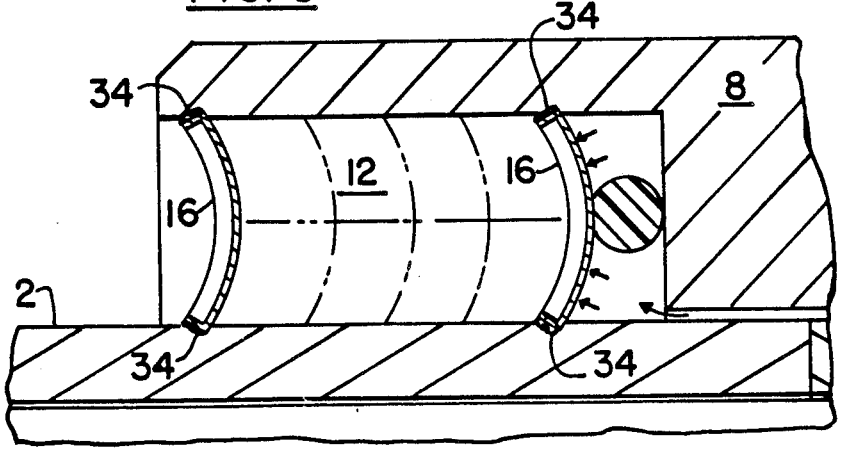
FIG. 5 is a cross-sectional view of an alternative to the sealing feature of FIG. 1.

Referring now to FIG. 5 of the accompanying drawings, the inner and outer surfaces of the hollow annulus 12 of FIG. 1 may be grooved as at 34 so as to insure proper alignment of the rings 16 in the assembly. In this instance, the rings are slightly larger than the ungrooved regions of the walls defining the grooves and reliance is had on the natural resilience of the deformed rings to permit them to be pushed into place within the annulus or the rings can be deformed and partially recovered to retain themselves in the grooves of the coupling housing prior to full recovery. The grooves 34 should be quite shallow, the depth illustrated in FIG. 5 being the cumulative depth resulting from initial grooving plus the bite into the material upon straightening of the rings.

Figure 6:
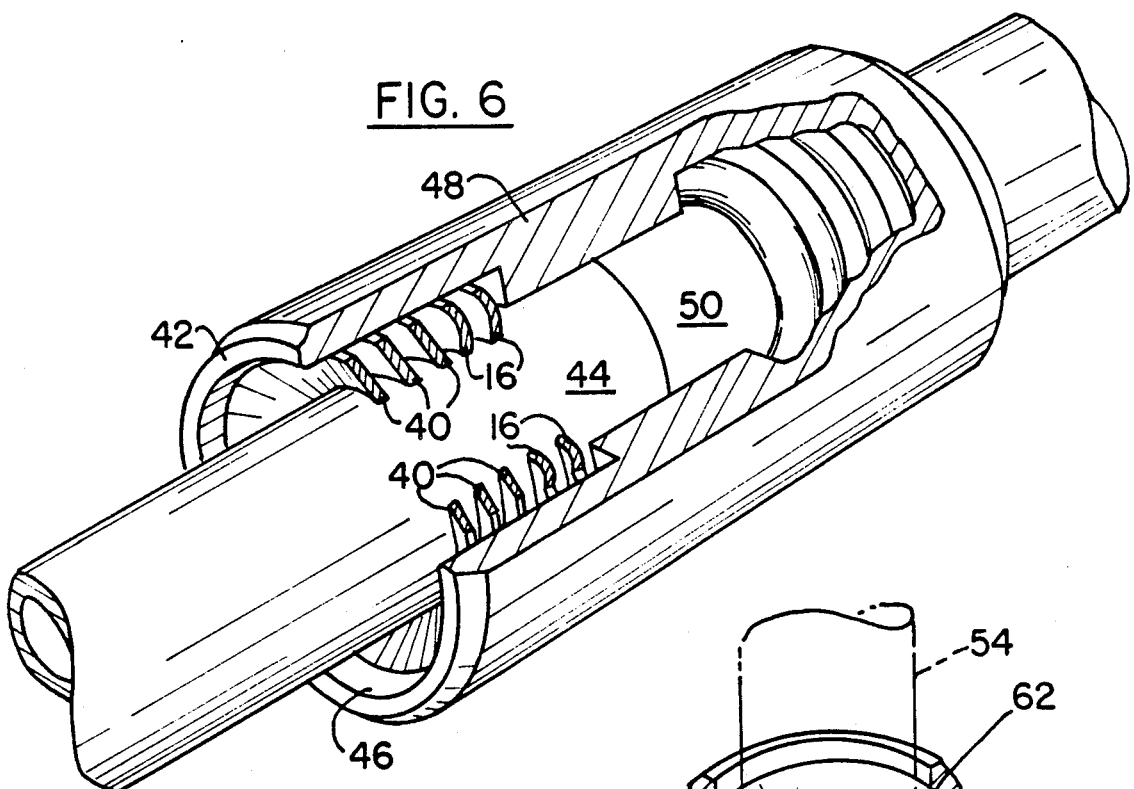
FIG. 6 is an illustration of a further embodiment of the invention employing both sealing and retainer rings.

Referring now specifically to FIG. 6 of the accompanying drawings, the assembly employs both sealing and retaining rings. It is noted that the curved sealing rings are not seated appreciably tighter as a result of an external pull on the conduit or as a result of generation of a separating force by the internal pressure on the juxtaposed ends of the conduits. The reason is that if the separation force is great enough, the inner surface of the rings can be pulled out from under the top of the ring and total separation occurs.

The above problem is overcome in another embodiment of the present invention by the use of shape memory retainers 40. The retainers 40 are conic sections which in their deformed state have a projection on a plane perpendicular to the axis of the conic about equal in length to the radial distance between outer wall 42 of a conduit 44 and inner wall 46 of sleeve 48. Thus, the retainers 40 may be slipped over the conduit 44 and abutting conduit 50 and then the sleeve 48 slid over both. The sealing rings 16 and retainers 40 are then heated and expand toward their manufactured shapes which are greater than the spacing between surfaces 42 and 46 thereby causing the rings to cut or bite into these surfaces.

As can be seen in FIG. 6, the retainers are slanted such as to provide a far greater resistance to separation than sealing rings 16, since the displacement of conduit 44 to cause the inner periphery of a retainer 40 to move under its outer periphery would infact cause destruction of the rings. Thus, the retainers 40 provide a considerably stronger retention force than the sealing members 16.

Figure 7:
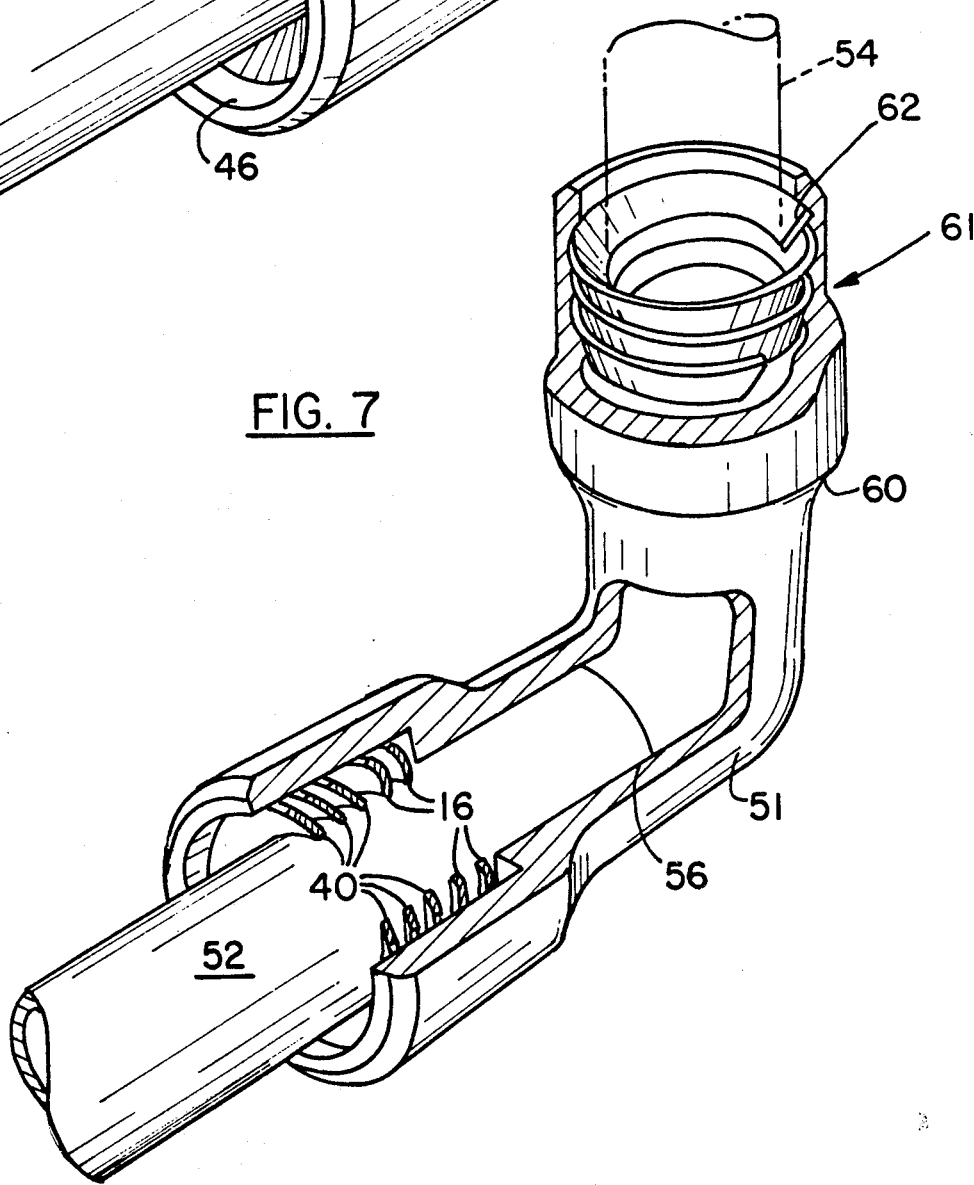
FIG. 7 is an illustration of a further embodiment of the present invention.

Referring now specifically to FIG. 7 of the accompanying drawings, in the configuration of this figure, the sleeve of the prior figures is replaced with a right angle elbow 51 with conduits 52 and 54 disposed at right angles to one another and with each preferably seated against a shoulder in the connector, only one shoulder, shoulder 56 being illustrated. In this configuration, shoulder 58 and 60 are provided to serve the same purpose as the base of the "T" in prior figures.

It should be noted that any type of junction may be employed in place of the sleeve 8 of FIG. 1 or the elbow 51 of FIG. 7. A T-junction or 45° elbow or Y-junction or the like, or an end cap, are all usable and useful; no limitation being placed on the form of the coupler which may also be a swivel joint.

It should be noted that in FIG. 7 the retainer rings 40 of FIG. 6 are replaced by a helix as clearly illustrated at 61 in the figure. The helix 62 functions as do the retainers of FIG. 6.

Figure 8A:
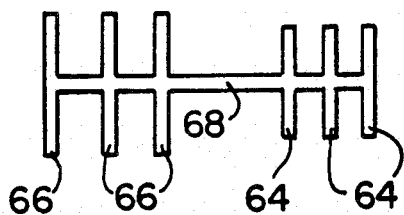
FIGS. 8A–8D are illustrations of a further preferred embodiment of the invention.

Referring now specifically to FIG. 8A of the accompanying drawings, there is illustrated an alternative embodiment of the seal and retainer rings of the present invention. A solid block of the shape memory metal is machined to provide the structure of FIG. 8 which is in actuality a number of straight rings 64 to be subsequently used as sealing rings and a plurality of rings 66 to be used as retainer rings all joined together by a concentric spine 68. The spine 68 may be a concentric ring, through 120° displaced ribs or other arrangement that holds the rings 64 and 66 so as to provide a unitary structure.

Figure 8B:
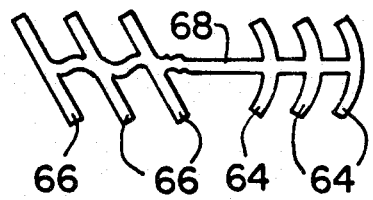
Figure 8C:
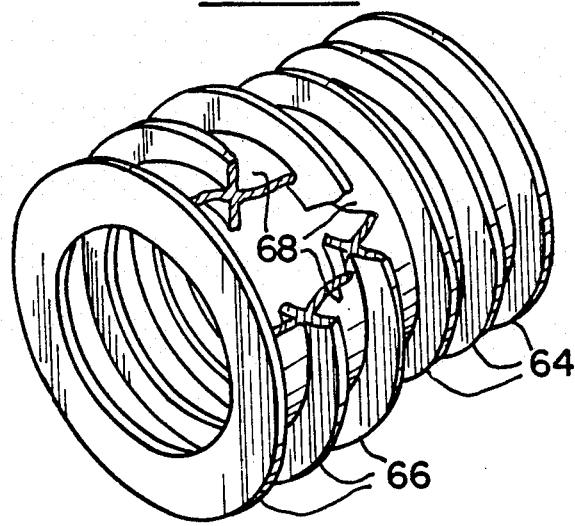
Figure 8D:
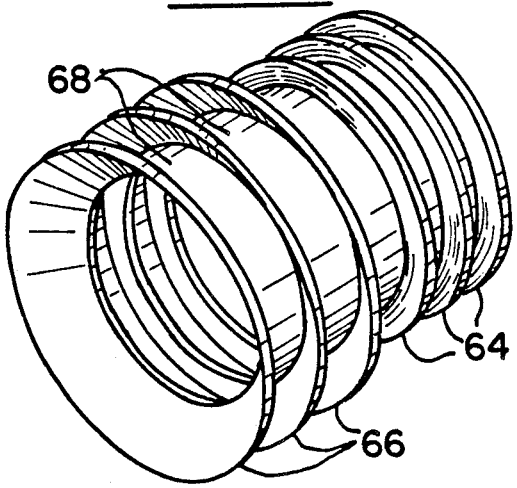

FIG. 8B illustrates the structure of FIG. 8A after the various rings 64 and 66 have been deformed into their initial martensitic configurations to provide the sealing and retainer rings, respectively. A broken-away view of the structure of FIG. 8A is illustrated in FIG. 8C. FIG. 8B is illustrated in perspective in FIG. 8D.

The advantage of the structure of FIGS. 8B–8C is that all of the rings may be machined, configured, and inserted as a unitary structure.

The present invention as described above provides a pipe coupling or like arrangement particularly adapted to producing permanent assemblies wherein the strong, pressure-tight couplings are provided with relatively simple, low cost materials involving relatively low labor costs in use in the invention structures. The couplers are simple "T"s which avoid complex structures and high machining costs as in the prior art. The sealing and retaining rings are fabricated essentially as washers and shaped in by well known and inexpensive techniques. Assembly is quick and can be performed by semi-skilled labor.

Once given the above disclosure, many other features, modifications and improvements will become apparent to the skilled artisan. Such other modifications, features and improvements are, therefore, considered a part of this invention, the scope of which is to be determined by the following claims:

I claim:

1. A coupling comprising:
a cylindical member having an inside diameter and an inside surface; and
a plurality of rings of shape-memory alloy having a martensitic state and an austenitic state, said rings interconnected by an axially extending spine, said rings being integral therewith, said rings positioned concentrically within said member, said rings each having an outside and an inside diameter and corresponding circumferences defining sharp edges, said rings being deformed dimensionally while said alloy is in the martensitic state, said outside diameter of each ring being compressed to a diameter less than the inside diameter of said cylindrical member, and said inside diameter of each ring being expanded to a diameter larger than the diameter of a substrate to be inserted in said rings, a change of said alloy from its martensitic state to its austenitic state recovering said rings toward their nondeformed dimension causing said sharp edges of said rings to engage and dig into both the inside surface of said cylindrical member and into a substrate that may be inserted therein to effect a seal therebetween.

2. A connecting element as in claim 1 wherein said plurality of rings comprises a helix shape.

3. A coupling as in claim 1 wherein at least one ring when in the non-deformed austenitic state is in the shape of a flat washer having a generally radially extending web, said web of said ring in its martensitic state capable of being deformed into a convex-concave shape, said ring being defined as a sealing ring.

4. A connecting element as in claim 3 wherein said plurality of rings comprises a helix shape.

5. A coupling as in claim 3 wherein at least one other ring in the non-deformed austenitic state is in the shape of a flat washer, said ring in its martensitic state capable of being deformed into a generally conic shape, said ring being defined as a retainer ring.

6. A connecting element as in claim 5 wherein said plurality of rings comprises a helix shape.

7. A coupling comprising:
a cylindrical member having an inside diameter and an inside surface; and
at least one ring of shape-memory alloy having a martensitic state and an austenitic state, said ring positioned concentrically within said cylindrical member, said ring having an outside and an inside diameter and corresponding circumferences defining sharp edges, said ring being deformed dimensionally while said alloy is in said martensitic state, said outside diameter being compressed to a diameter less than the inside diameter of said cylindrical member and said inside diameter being expanded to a diameter larger than the diameter of a substrate to be inserted in said ring, said ring including a shell over at least a part of said ring to enhance connection with said cylindrical member and a substrate that may be inserted within said ring, said shell having sharp edges corresponding to the sharp edges of said ring a change of said alloy from its martensitic state to its austenitic state recovering said ring toward its non-deformed dimension causing said sharp edges of said shell to engage and dig into both the inside surface of said cylindrical member and into a substrate that may be inserted therein to effect a seal therebetween.

8. A coupling as in claim 7 including a plurality of said rings in coaxial alignment.

9. A coupling as in claim 8 wherein said rings are interconnected by an axially extending spine and are integral therewith.

10. A connecting element as in claim 9 wherein said plurality of rings comprises a helix shape.

11. A coupling as in claim 9 where at least one of said rings when in the non-deformed austenitic state is in the shape of a flat washer having a generally radially extending web, said web of said ring in its martensitic state capable of being deformed into a convex-concave shape, said ring being defined as a sealing ring.

12. A connecting element as in claim 11 wherein said plurality of rings comprises a helix shape.

13. A coupling as in claim 11 wherein at least one other ring in its non-deformed austenitic state is in the shape of a flat washer, said ring in its martensitic state capable of being deformed into a generally conic shape, said ring being defined as a retaining ring.

14. A coupling as in claim 13 wherein said rings comprise a helix shape.

15. A connecting element for inter-connecting a cylindrical member that may be placed over said connecting element and a substrate that may be inserted within said connecting element, said connecting element comprising:
a plurality of rings of shape-memory alloy having a martensitic state and an austenitic state, said rings interconnected by an axially extending spine and being integral therewith, each of said rings having an inside and an outside diameter and corresponding circumferences defining sharp edges, said rings being deformed dimensionally while said alloy is in said martensitic state, said outside diameters being compressed to a diameter less than the inside diameter of a cylindrical member into which said rings may be inserted, and said inside diameters being expanded to a diameter larger than the diameter of a substrate that may be inserted within said rings, a change of said alloy from its martensitic state to its austenitic state recovering said rings toward their non-deformed dimension causing said sharp edges of said rings to engage and dig into both the inside surface of a cylindrical member that may surround said rings and into a substrate that may be inserted within said rings to effect a seal therebetween.

16. A connecting element as in claim 15 wherein said plurality of rings comprises a helix shape.

17. A connecting element as in claim 16 wherein said helix includes a shell over at least a portion thereof to enhance connection between members to be interconnected, said shell having sharp edges corresponding to the sharp edges of said rings.

18. A connecting element as in claim 15 wherein at least one of said rings when in the non-deformed austenitic state is in the shape of a flat washer having a generally radially extending web, said web of said ring in its martensitic state capable of being deformed into a convex-concave shape, said ring being defined as a sealing ring.

19. A connecting element as in claim 18 wherein said plurality of rings comprises a helix shape.

20. A connecting element as in claim 18 wherein at least one other ring in the non-deformed austenitic state is in the shape of a flat washer, said ring in its martensitic state capable of being deformed into a generally conic shape, said ring being defined as a retaining ring.

21. A connecting element as in claim 20 wherein said rings comprise a helix shape.

22. A connecting element as in claim 15 wherein said rings include a shell over at least a portion of said rings to enhance contact between members to be interconnected, said shell having sharp edges corresponding to the sharp edges of said rings.

23. A connecting element for inter-connecting a cylindrical member that may be placed over said connecting element and a substrate that may be inserted within said connecting element, said connecting element comprising:

at least one ring of shape-memory alloy having a martensitic state and an austenitic state, said ring having an inside and an outside diameter and corresponding circumferences defining sharp edges, said ring being deformed dimensionally while said alloy is in said martensitic state, said outside diameter being compressed to a diameter less than the inside diameter of a cylindrical member into which said ring may be inserted, and said inside diameter being expanded to a diameter larger than the diameter of a substrate that may be inserted within said ring, said ring including a shell over at least a part of said ring to enhance connection with the cylindrical member that may surround said ring and a substrate that may be inserted within said ring, said shell having sharp edges corresponding to the sharp edges of said ring a change of said alloy from its martensitic state to its austenitic state recovering said ring toward its non-deformed dimension causing said sharp edges of said shell to engage and dig into both the inside surface of a cylindrical member that may surround said ring and into a substrate that may be inserted within said ring to effect a seal therebetween.

24. A connecting element as in claim 23 including a plurality of said rings in coaxial alignment.

25. A connecting element as in claim 24 wherein said rings are interconnected by an axially extending spine and are integral therewith.

26. A connecting element as in claim 25 where at least one of said rings when in the non-deformed austenitic state is in the shape of a flat washer having a generally radially extending web, said web of said ring in its martensitic state capable of being deformed into a convex-concave shape, said ring being defined as a sealing ring.

27. A connecting element as in claim 26 wherein at least one other ring in its non-deformed austenitic state is in the shape of a flat washer, said ring in its martensitic state capable of being deformed into a generally conic shape, said ring being defined as a retaining ring.

28. A connecting element as in claim 27 wherein said rings comprise a helix wherein said shell extends over at least a portion thereof to enhance connection between members to be connected.

* * * * *

UNITED STATES PATENT AND TRADEMARK OFFICE
CERTIFICATE OF CORRECTION

PATENT NO. : 4,773,680

DATED : September 27, 1988

INVENTOR(S) : John F. Krumme

It is certified that error appears in the above-identified patent and that said Letters Patent is hereby corrected as shown below:

Column 2, line 3, delete "tmeperature" and insert
   --temperature--.

Column 5, lines 48 and 49, delete "nondeformed" and insert
   -- non-deformed --.

Signed and Sealed this

Twentieth Day of March, 1990

Attest:

JEFFREY M. SAMUELS

Attesting Officer

Acting Commissioner of Patents and Trademarks